(12) United States Patent
Yoo et al.

(10) Patent No.: US 6,621,943 B1
(45) Date of Patent: Sep. 16, 2003

(54) SYSTEM AND METHOD FOR CONVERTING ANALOG DATA TO DIGITAL DATA

(75) Inventors: Woo Sik Yoo, Palo Alto, CA (US); Kitaek Kang, Dublin, CA (US); Taro Yamazaki, San Jose, CA (US)

(73) Assignee: WaferMasters, Inc., San Jose, CA (US)

( * ) Notice: Subject to any disclaimer, the term of this patent is extended or adjusted under 35 U.S.C. 154(b) by 567 days.

(21) Appl. No.: 09/590,714

(22) Filed: Jun. 8, 2000

(51) Int. Cl.[7] .................................................. G06K 9/20
(52) U.S. Cl. ....................................................... 382/317
(58) Field of Search ................................. 382/100, 317; 348/373, 376, 82, 114, 143; 702/100, 138, 141, 142, 165, 188, 189

(56) References Cited

U.S. PATENT DOCUMENTS

| | | | | |
|---|---|---|---|---|
| 4,837,708 A | * | 6/1989 | Wright | 702/100 |
| 4,947,247 A | | 8/1990 | Farver | 358/107 |
| 5,013,154 A | | 5/1991 | Kominsky | 356/375 |
| 5,673,331 A | | 9/1997 | Lewis et al. | 382/100 |
| 6,262,767 B1 | * | 7/2001 | Wakui | 348/373 |

FOREIGN PATENT DOCUMENTS

EP         0 279 759         8/1988 ............ G01D/5/39

* cited by examiner

*Primary Examiner*—Jose L. Couso
(74) *Attorney, Agent, or Firm*—MacPherson Kwok Chen & Held LLP

(57) ABSTRACT

An improved system and method for obtaining data related to the operation of a processing system which converts from analog measurement data, usually obtained from meters and gages, to digital data. Visual images of various types of measuring instruments are collected and used for measuring a process functionality. An image sensor provides an image of a first feature of the measuring instrument. The image data is processed by an image processor, which is operable to detect a first feature and determine its position relative to a second feature of the measuring instrument. The difference in the relative positions (measured distance) can then be compared to a predetermined or expected value. If the measured and expected values are not substantially the same, a signal can be generated which instructs a controller to adjust the process functionality until the measured value reaches the expected value.

14 Claims, 5 Drawing Sheets

SYSTEM AND METHOD FOR CONVERTING ANALOG DATA TO DIGITAL DATA

BACKGROUND OF THE INVENTION

1. Field of the Invention

The present invention generally relates to a data conversion system and method, and more particularly, to a system and method for converting analog data to digital data using visual images.

2. Description of the Related Art

In the processing industry it is generally important to be able to monitor on-going processes. Specifically, in the semiconductor processing industry, it is important to monitor, such parameters as temperature, pressure, and mass flow rate.

In a typical semiconductor processing system, a mass flow controller, for example, is a well-known instrument used to maintain a preselected mass flow rate. A typical mass flow controller operates on the principle of adding heat energy to a flowing fluid and measuring a heat transfer function and or thermal mass transport function in two sensors spaced in or near the flowing fluid. The measure of the temperature difference between the sensors is a function of fluid mass flow. When the fluid at one temperature having passed by the first upstream sensor is then heated to a higher temperature, the resistivity of the downstream second sensor is changed, the measured temperature difference between the sensors being the measure of flow. In a gas, the rise in temperature is a function of the amount of heat added, the sensor geometry and conductivity, the mass flow rate and the properties of the gas.

In FIG. 1, an example of a typical mass flow controller 10 is shown, which includes a horizontal bypass sensor tube 12 with upstream and downstream sensors 14 and 16, respectively, exterior of the tube and a heater element 18 similarly wound between sensors 14 and 16 on the tube exterior. When fluid (liquid or gas) is flowing in tube 12, heat is transferred along the line of flow from upstream sensor 14 to downstream sensor 16 producing a signal. Each sensor 14 and 16 form part of a bridge and amplifier circuit, which can detect the temperature difference caused by the greater heat input to the downstream sensor 16, and can produce a signal proportional to the gas flow rate. The flow rate signal is compared to a command voltage from a potentiometer or the like, which generates an error signal. The error signal causes a valve to change the flow rate until a predetermined flow rate has been reached.

Unfortunately, the mass flow controller, thus described, has several drawbacks. For example, heat conduction is through the tube wall, which may result in relatively long response times. To provide satisfactory performance, this type of mass flow controller generally requires heating of the fluid up to about 100° –200° C. greater than the ambient temperature of the incoming fluid. In many gaseous applications, this may be above the safe temperature limit of the gas or cause decomposition of the gas or reaction with contaminants. Moreover, the heater element requires greater amounts of power. Further, for each gas composition and flow range, the instrument must be calibrated because of nonlinearities and inconsistent correction factors.

For this reason, what is needed is an improved system and method for obtaining data related to the operation of a processing system, which is less complex to implement, less expensive to put into practice, and more reliable than currently existing systems and methods. The system and method should include the ability to convert analog data obtained from various meters and gages, to a digital data signal useable for operating various control devices.

SUMMARY OF THE INVENTION

The present invention provides an improved system and method for obtaining data related to the operation of a processing system, such as a semiconductor processing system. Advantageously, the present invention provides conversion from analog measurement data, usually obtained from meters and gages, to digital data, which is typically more useful for operating various control devices.

The present invention provides a system for collecting visual images of various types of measuring instruments, which are used for measuring a process functionality, such as mass flow rate, temperature, pressure, and the like. An image sensor is included in the system for providing an image of a first feature of the measuring instrument. The image data is processed by an image processor, which is operable to detect the first feature and determine its position relative to a second feature of the measuring instrument, which is the measured value. The measured value can then be compared to a predetermined or expected value. If the measured and expected values are not substantially the same (within an acceptable limit), a signal can be generated which instructs a controller to adjust the process functionality until the measured value reaches the expected value.

The present invention compares digitally formatted data rather than, for example, temperature differences (see FIG. 1) and is therefore less complex to implement, less costly to put into practice, and more reliable then typical mass flow controllers. Advantageously, the present invention may provide uninterrupted measurement using readily available and easily implemented conventional measuring instruments. The application of the present invention is flexible in that the invention can be used to monitor measuring instruments that currently exist on processing systems without having to change out the instruments.

Other uses, advantages, and variations of the present invention will be apparent to one of ordinary skill in the art upon reading this disclosure and accompanying drawings.

DETAILED DESCRIPTION

The present invention provides a system and associated method for collecting analog measurement data and converting the data to digital data for use with various control mechanisms. The invention may be used with a variety of applications including the manufacturing process of semiconductor devices, hard disks, and liquid crystal displays. By way of example, the invention can be used with etching, deposition, chemical-mechanical planarization, and rapid thermal processing systems.

Figure 1:
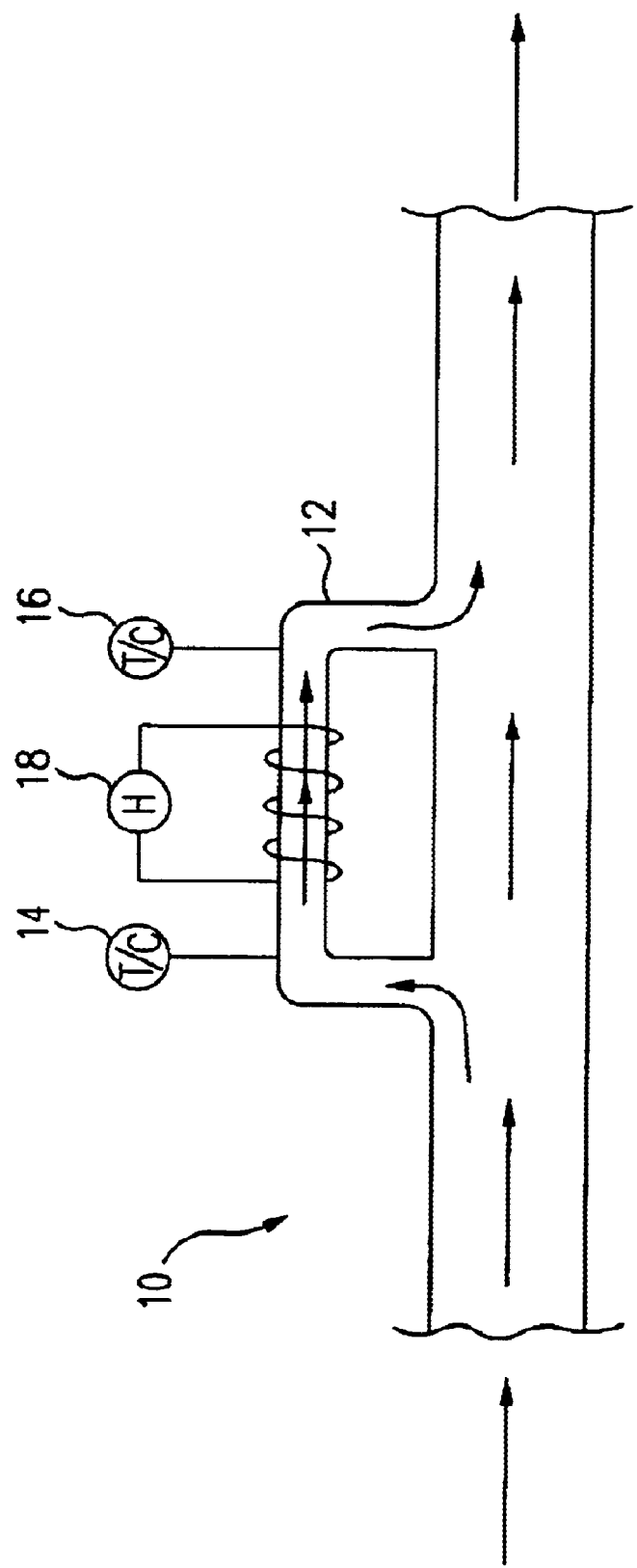
FIG. 1 is a simplified illustration of a typical mass flow controller.
Figure 2:
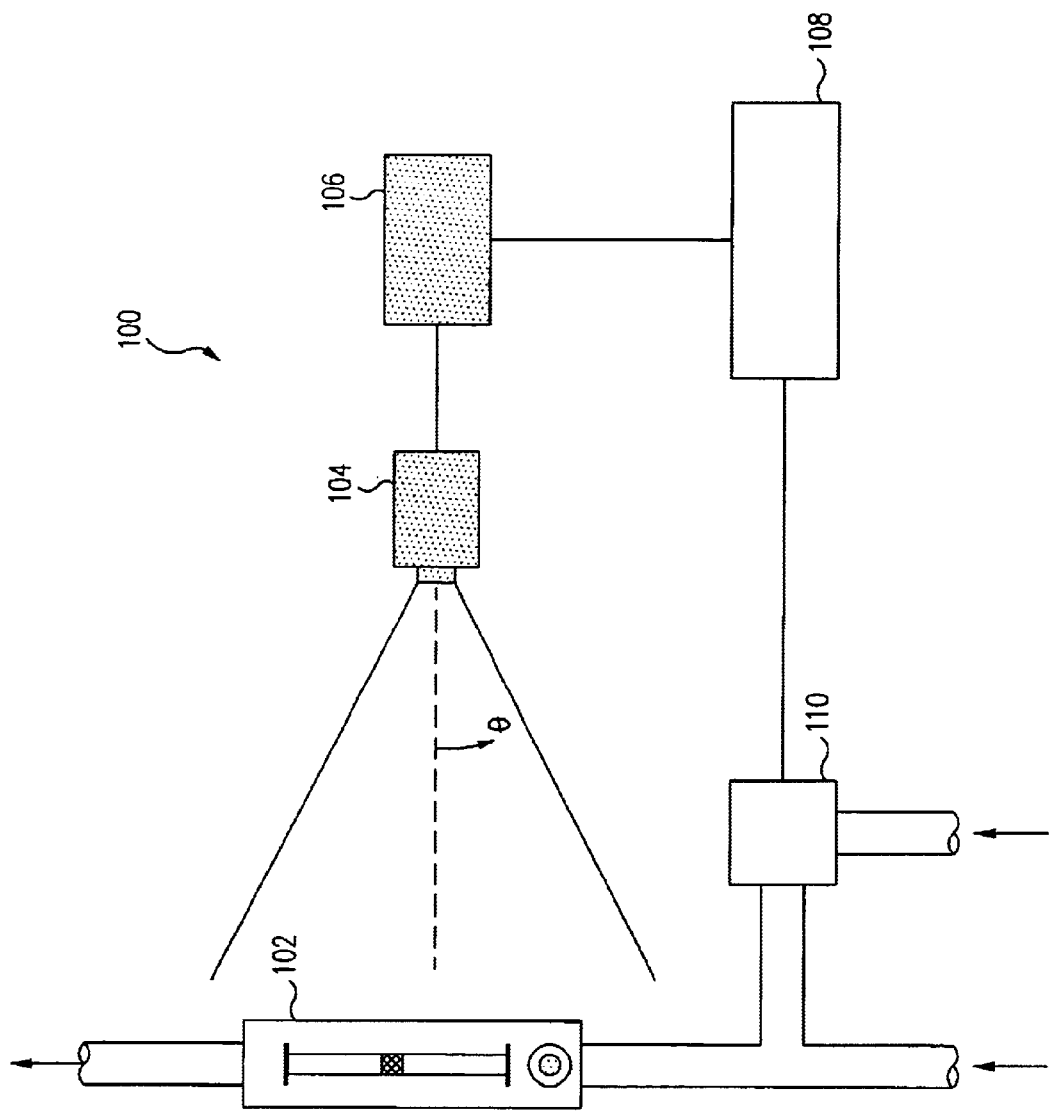
FIG. 2 is a simplified diagram of a data collecting system in accordance with an embodiment of the present invention.

FIG. 2 is a simplified diagram of a data collection system 100 in accordance with an embodiment of the present invention. Data collection system 100 may include a measuring instrument 102 or, alternatively a plurality of measuring instruments (not shown), which are used to verify the operating conditions of a processing system. System 100 also includes an image sensor 104, an image processor 106, a controller 108, and a control mechanism 110.

Measuring instrument 102 may be any device used to determine the value or magnitude of a quantity or variable. Of interest, are those quantities or variables that help to define or describe an object, a system, or a process. For example, in an industrial process, specifically a semiconductor manufacturing process, measurement and control of variables, such as temperature, pressure, time, velocity, and flow rate, determine quality and efficiency of production.

Measuring instrument 102 may include, but is not limited to any instrument which can provide a real-time viewing capability, such as a thermometer, a manometer, a barometer, a dial gage, and a flow meter, optionally, measuring instrument 102 can have a liquid crystal display, (LCD), which gives an alphanumeric indication of the value of a quantity or variable.

Figure 3B:
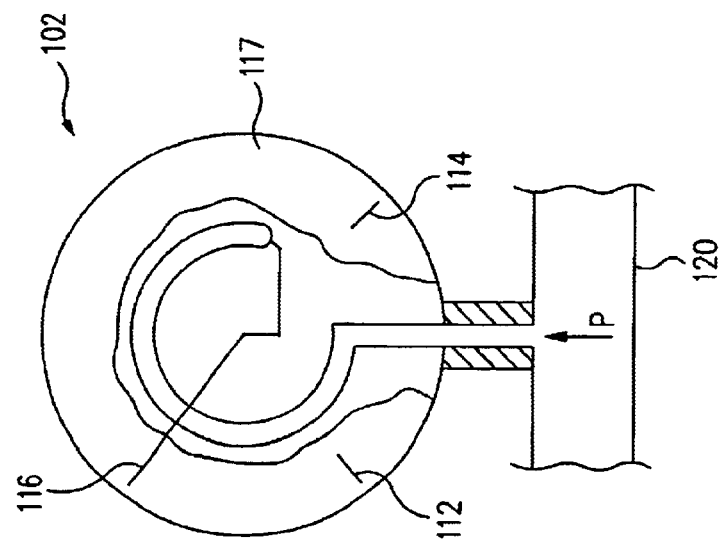
FIGS. 3A–3C are simplified illustrations of embodiments of measuring devices in accordance with the present invention.
Figure 3A:
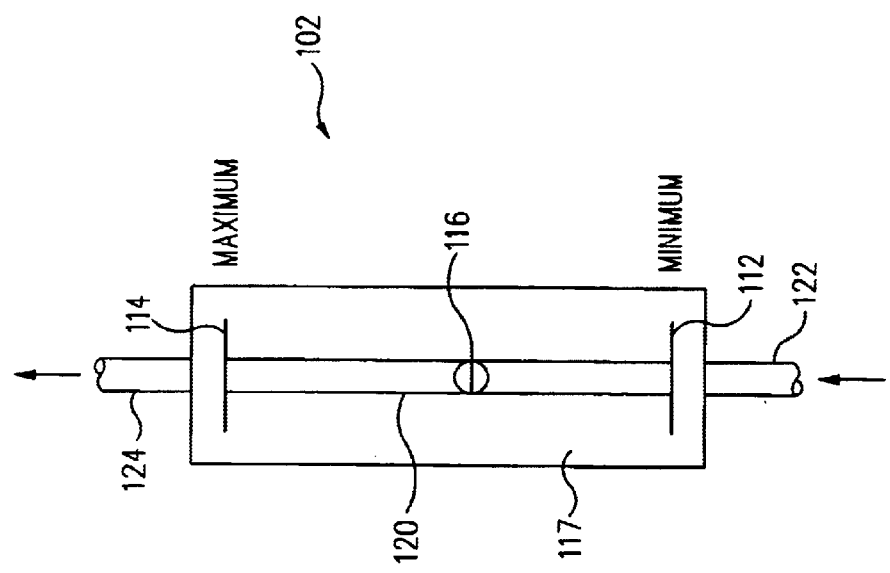
Figure 3C:
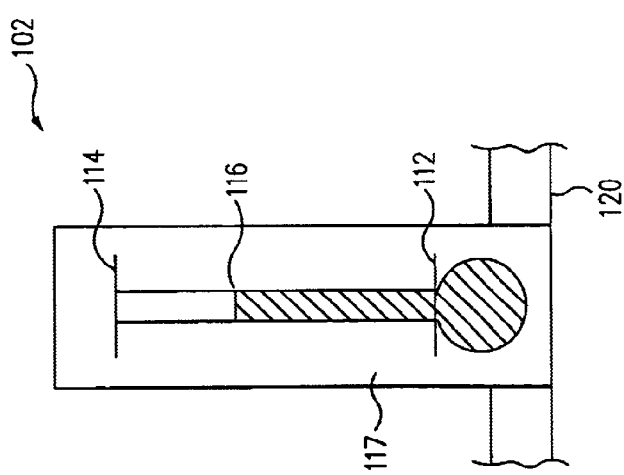

As illustrated in the embodiments shown in FIGS. 3A–3C, measuring instrument 102 includes a minimum value indicator 112, a maximum value indicator 114, and a present value indicator 116 (e.g. a metering float in a flow meter). Each indicator 112, 114, and 116 is a feature that can be imaged by image sensor 104. Accordingly, features 112,114 and 116 must provide contrast, such that its location or position can be determined relative to the location or position of each other feature 112,114 and 116. For example, as illustrated in FIG. 3A, measuring instrument 102 includes lines or calibrations (i.e. features 112 and 114) drawn, etched or formed on instrument 102 at specific locations, which represent a particular value. The lines are sized and colored, such that they provide a contrast with faceplate 117 of instrument 102, so that image sensor 104 can detect the lines. For example, faceplate 117 may provide a black background while indicators 112 and 114 are thick white lines.

FIG. 3A illustrates one embodiment of measuring instrument 102, which is a mass flow meter. In operation, a substance (liquid or gas) enters a flow tube 120 at a first end 122 and exits at a second end 124. By applying well known volumetric flow science, the action of the substance flowing through tube 120 causes present value indicator 116 to rise (or fall) between minimum indicator 112 and maximum indicator 114.

FIG. 3B illustrates an embodiment in which measuring instrument 102 is a dial gage, such as a well known Bourdon-tube gage. The dial gage operates in a well-known fashion to convert linear into rotary motion to move a pointer over a calibrated scale. As before, by action of pressure P flowing through tube 120, present value indicator 116 can be made to rotate between minimum indicator 112 and maximum indicator 114.

FIG. 3C illustrates an embodiment in which measuring instrument 102 is a thermometer. Again, applying well known volumetric flow science, by action of the temperature of a substance flowing through tube 120, present value indicator 116 can rise (or fall) between minimum indicator 112 and maximum indicator 114.

Referring again to FIG. 2, image sensor 104 may be mounted near measuring instrument 102 using conventional mounting techniques. The conventional mounting allows for precision positioning of image sensor 104. In one embodiment, image sensor 104 can be positioned with a view angle θ relative to a line of sight axis 130 of between 0° (e.g. directly along axis 130) and 30°; preferably between about 0° and 5° from axis 130. Once an image is acquired, conventional image processing techniques can be used to digitally "tilt" or to "zoom" to a specific portion of the acquired image to accommodate the differences in various camera mount configurations.

The image of measuring instrument 102 acquired by image sensor 104 is used to provide the position of present level indicator 116 between minimum indicator 112 and maximum indicator 114.

For the purpose of acquiring this image, image sensor 104 may be any conventional camera, such as a CCD camera, a video camera, a photographic camera, or a digital camera, which can record an image of a target object as digital image data upon a recording medium such as a memory card. In one embodiment, camera 104 may be a QUICKCAM™ Home camera from Logitech Corporation of Fremont, Calif. As will be described in greater detail below, the image acquired using camera 104 is provided to image processor 106 for subsequent image processing. The Logitech QUICKCAM™ Home camera provides digitized image output, which can be provided to image processor 106 via a Universal Serial Bus ("USB") (not shown). Optionally, the image acquired using a non-digital camera 104 is first digitized using a conventional digitizer before the image is processed in image processor 106. As described below, the output signals from camera 104 are applied as input to image processor 106 for use in computing the relative position of indicators 112, 114,and 116.

The output from image processor 106 is applied to controller 108. Controller 108 controls the operation of control mechanism 110, which may include drive motors, valves, solenoids, actuators, and the like. Control mechanism 110 enables the adjustment of the processing functionality being monitored (e.g. mass flow, temperature, pressure, and the like). Details of the control circuitry are conventional and can be readily tailored by those of usual skill in the art to a particular function.

Figure 4:
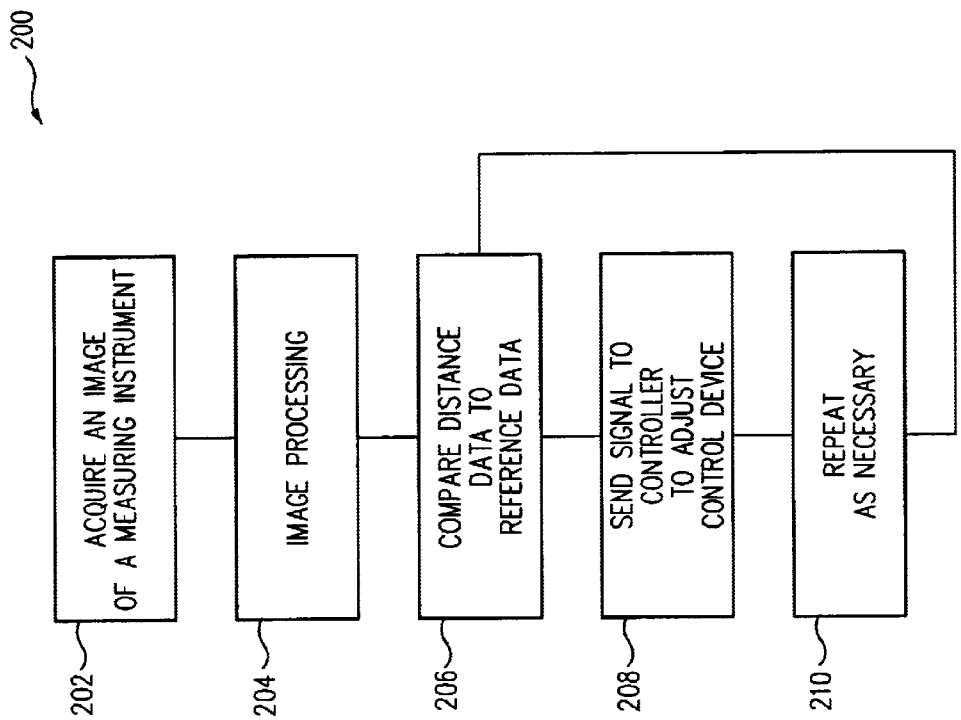
FIG. 4 is a flow diagram of the operation of the present invention.

FIG. 4 is a flow diagram 200 of the process using the system of the present invention. Referring to FIGS. 2, 4 and 5A–5C, the operation of the present invention begins by acquiring an image (202) of measuring instrument 102. Light from measuring instrument 102 is focused by a photographic lens upon a photoelectric conversion element in an imaging section. Analog image data, which is photoelectrically converted by the photoelectric conversion element, is converted into digital data by an A/D conversion device. Various forms of signal processing are performed upon this digital image data, and the data is then temporarily stored in a buffer memory.

In one embodiment, the digitized image output signal from image sensor 104 may be stored as a bitmap. Bitmaps are known in the art. Generally, a bitmap can be thought of as an array of pixels, each pixel representing a point on the digitized image. By knowing the resolution of the bitmap, the number of pixels in each row and the number of pixels in each column of the bitmap are also known. For example, a 640×480 bitmap has 480 rows and 640 columns of pixels. Each pixel in a selected column is extracted and converted to units of red, green, and blue ("RGB") intensity or normal gray scale intensity. The resulting intensity values of all pixels in the selected column can be loaded into a spreadsheet or application program for processing. The invention can be performed using any pixel or image format. For example, each pixel in the selected column can also be converted to the so-called HSV format.

The digital image data is directed to image processor 106 for image processing (204). Image processor 106 receives the digital image data to perform a well-known digital image processing technique, such as those described generally in R. Gonzales and R. Woods, "Digital Image Processing", Addison-Wesley Publishing Co., 1993, pgs. 518–560, and as generally described in G. Baxes, "Digital Image Processing: Principles and Applications," Wiley and Sons, Inc. 1994, which are herein incorporated by reference for all purposes.

Figure 5B:
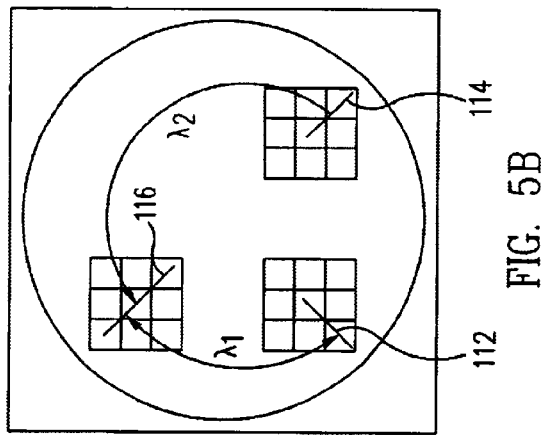
FIGS. 5A–5C are simplified illustrations of images in accordance with the present invention.
Figure 5C:
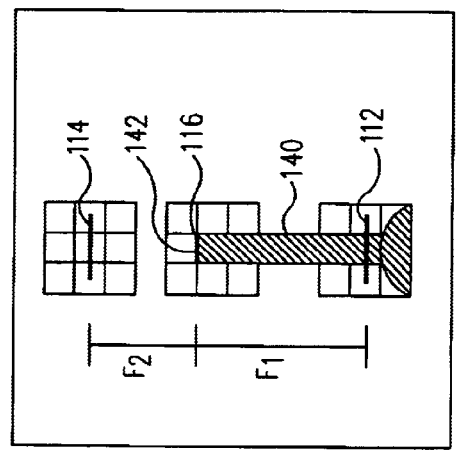
Figure 5A:
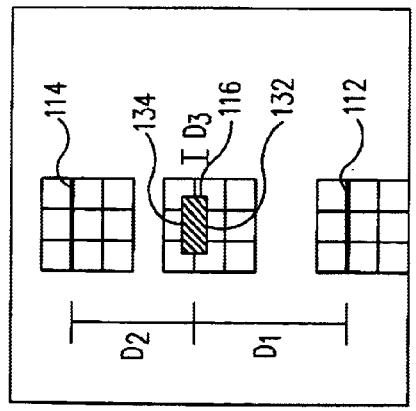

In one embodiment, shown in FIG. 5A, the image processing techniques extract image components that are useful in the representation and description of shape boundaries and the like, and are used herein to detect indicators 112, 114, and 116. For example, each indicator is a boundary between two regions with relatively distinct gray-level properties. The indicator is detected by distinguishing discontinuities in the gray-level where the transition between two regions occurs. A map can be created from the detection of the line. The map is an intrinsic image, which contains the likelihood that a pixel belongs to an indicator line. Typically, a small neighborhood of pixels, such as a 3×3 or 5×5 array of pixels, is analyzed. All points that are similar are linked forming a boundary of pixels that share common properties, such as strength and direction. Using the well known concept of using the gradient for image differentiation, the gradient is defined as:

$$\nabla f = \begin{bmatrix} G_x \\ G_y \end{bmatrix} = \begin{bmatrix} \partial f / \partial x \\ \partial f / \partial y \end{bmatrix}$$

and $$\nabla f = mag(\nabla f) = [G_x^2 + G_y^2]^{1/2}$$

Thus a line coordinate (x', y') in the neighborhood of (x, y) is similar in magnitude to the pixel at (x, y) if:

$$|\nabla f(x, y) - \nabla f(x', y')| \leq T$$

where T is a nonnegative threshold. The direction of the gradient vector is given by:

$$\alpha(x, y) = \tan^{-1}(G_y/G_x)$$

Thus, a line pixel at (x', y') in the neighborhood at (x, y) has a similar angle to the pixel (x, y) if:

$$|\alpha(x, y) - \alpha(x', y')| < A$$

where A is an angle threshold.

General purpose image processing software can be used to perform many of the tasks described above. One such software package is SHERLOCK, available from iMAGING Technology, Inc. of Bedford, Mass. Another image processing application for use with the present invention is DT Vision Foundary™, available from Data Translation, Inc. of Marlboro, Mass.

Once indicators 112, 114, and 116 are known, image processor 106 can use well-known mathematical relationships to estimate the relative distance between minimum level indicator 112 and present level indicator 116, referenced as $D_1$. Optionally, the relative distance between maximum level indicator 114 and present level indicator 116, referenced as $D_2$, can also be determined. In one embodiment, present level indicator 116 may be a metering float or other device, which has a thickness greater than a single line (see FIG. 5A). In this embodiment, image processor 106 can detect a first edge 132 and a second edge 134 using the technique described above. Once these edges are known the distance between them $D_3$ can be calculated. By dividing this distance in half, the center of the indicator can be determined for use in calculating distances $D_1$ and $D_2$.

After distances $D_1$ and $D_2$ are known, the distances are compared to a preselected reference distance to determine whether the system requires adjustment (206). If the measured distance is different from the reference distance beyond a predetermined limit, the image processor generates a signal (208). The signal is a direction, which is sent to controller 108. Controller 108 receives the signal, which instructs controller 108 to perform a function. For example, using the mass flow meter embodiment of FIG. 3A, if it is found that the distance between present level indicator 116 and minimum level indicator 112 is too low, controller 108 is instructed to direct valve mechanism 110 to increase the flow rate. As soon as the distance between indicator 112 and 116 is within a predetermined range, controller 108 is instructed to adjust valve 110 accordingly. The process is repeated (210) to maintain the proper flow rate.

In another embodiment, shown in FIG. 5B, by using the techniques described above, indicators 112, 114, and 116 may be found on the image of a dial gage (see FIG. 3B). In this embodiment, image processor 106 can use well-known mathematical relationships to estimate the relative angle between minimum level indicator 112 and present level indicator 116, referenced as $\lambda_1$. Optionally, the relative angle between maximum level indicator 114 and present level indicator 116, referenced as $\lambda_2$, can also be determined. After angles $\lambda_1$ and/or $\lambda_2$ are known, the values are compared to a preselected reference value, which corresponds to a desired operational value, to determine whether the system requires adjustment. If the measured angle is different from the reference angle beyond a predetermined limit, the image processor generates a signal. The signal is a direction, which is sent to controller 108. Controller 108 receives the signal, which instructs controller 108 to perform a function. For example, using the pressure meter embodiment of FIG. 3B, if it is found that the angle between present level indicator 116 and minimum level indicator 112 is too shallow, controller 108 is instructed to direct pressure regulator 110 to increase the pressure to the system. As soon as the angle between indicator 112 and 116 is back within a predetermined range, the controller is instructed to adjust pressure regulator 110 accordingly to maintain the proper pressure in the system.

In yet another embodiment, shown in FIG. 5C, by using the techniques described above, indicators 112, 114, and 116 may be found on the image of a thermometer (see FIG. 3C). In this embodiment, the thermometer presents a column shaped indicator 140, which has a leading edge 142 that defines present level indicator 116. As before, image processor 106 can use well-known mathematical relationships to estimate the relative distance between minimum level indicator 112 and present level indicator 116, referenced as $F_1$. Optionally, the relative distance between maximum level indicator 114 and present level indicator 116, referenced as $F_2$, can be determined. After values $F_1$ and $F_2$ and/or known, the values are compared to a preselected reference value, which corresponds to a desired operational temperature, to determine whether the system requires adjustment. If the measured distances $F_1$ and/or $F_2$ are different from the reference value beyond a predetermined limit, the image processor generates a signal. The signal is a direction, which is sent to controller 108. Controller 108 receives the signal, which instructs controller 108 to perform a function. For example, using the thermometer embodiment of FIG. 3C, if it is found that the distance between present level indicator 116 and minimum level indicator 112 is too large, controller 108 is instructed to direct temperature regulator 110 to decrease the temperature to the system. As soon as the distance between indicator 112 and 116 is back within a predetermined range, the controller is instructed to adjust temperature regulator 110 accordingly to maintain the proper temperature in the system.

Flow meters, pressure gages, thermometers, as well as other types of measuring instruments, may have additional calibrations or other extraneous features, other than the minimum, maximum, and present level indicators. To reduce confusion that may occur as to the proper reference point to be used in the image processing calculations described above, these calibrations and extraneous features should be ignored. Accordingly, an initial calibration image can be made of the desired measuring instrument. Features that are to be used in calculating the measured values are selected, while the remaining features are ignored. Thus, during operation of the present invention, the non-desired features can be filtered from the image.

The description of the invention given above is provided for purposes of illustration and is not intended to be limiting. The invention is set forth in the following claims.

What is claimed is:

1. A system for collecting data using a visual image comprising:
    a measuring instrument for measuring a process functionality;
    an image sensor for providing an image of a plurality of features of said measuring instrument;
    an image processor operable to detect a first feature of said plurality of features of said image at a first reference time and detect a second feature of said plurality of features at a second reference time, said image processor configured to compute the relative position in distance and/or angle between said first feature and said second feature, said image processor configured to generate a signal representative of said relative position; and
    a controller for adjusting said process functionality in response to said signal.

2. The system of claim 1, wherein said measuring instrument is taken from the group consisting of flow meters, dial gages, thermometers, hygrometers, pressure gages, watch/clocks, timers, speedometers, and tachometers.

3. The system of claim 1, wherein said measuring instrument comprises an LCD display.

4. The system of claim 1, wherein said plurality of features—comprises a minimum level indicator, a maximum level indicator and a current level indicator.

5. The system of claim 4, wherein said image processor comprises means for computing the distance and/or angle between said current level indicator and said minimum and/or said maximum level indicator.

6. The system of claim 1, wherein said image sensor comprises a camera, said camera taken from the group consisting of a CCD camera, a video camera, a still camera, and a digital camera.

7. The system of claim 1 wherein said image is a digitized image.

8. The system of claim 1, wherein said process functionality comprises mass flow through a semiconductor processing system.

9. The system of claim 8, wherein said controller operates a valve which adjusts a flow rate of said mass flow.

10. A system for collecting data using a visual image comprising:
    means for measuring a process functionality;
    a measuring instrument for measuring a process functionality;
    an image sensor for providing an image of said measuring means;
    means for processing said image to determine a position of a first feature and a second feature of said measuring means, said means for processing said image configured to compute the relative position in distance and/or angle between said first feature and said second feature; and
    a controller for adjusting said process functionality in response to said relative position of said first and said second features.

11. A method for determining an operating parameter of a process, said method comprising:
    acquiring image data of a measuring instrument having a first feature;
    acquiring image data of a second feature of said measuring instrument;
    computing a relative position between said first feature and said second feature in distance and/or angle;
    generating a signal representative of relative position computation; and
    adjusting a processing function in response to said signal.

12. The method of claim 11, wherein said measuring instrument is taken from the group consisting of flow meters, dial gages, thermometers, hygrometers, pressure gages, watch/clocks, timers, speedometers, and tachometers.

13. The method of claim 11, wherein said processing function comprises mass flow through a semiconductor processing system.

14. The method of claim 11, wherein the image is acquired using a camera taken from the group consisting of a CCD camera, a video camera, a still camera, and a digital camera.

* * * * *